United States Patent [19]

Biondetti

[11] 3,949,455
[45] Apr. 13, 1976

[54] FLEXURE-COMPENSATING ROLL
[75] Inventor: Mario Biondetti, Schio, Italy
[73] Assignee: Escher Wyss Limited, Zurich, Switzerland
[22] Filed: Apr. 3, 1975
[21] Appl. No.: 564,758

[30] Foreign Application Priority Data
Apr. 10, 1974 Switzerland.................. 5048/74

[52] U.S. Cl............................................ 29/116 AD
[51] Int. Cl.².................................... B21B 13/02
[58] Field of Search..... 29/116 AD, 116 R, 113 AD

[56] References Cited
UNITED STATES PATENTS

| 3,286,325 | 11/1966 | Justus | 29/116 AD |
| 3,562,882 | 2/1971 | Widmer et al. | 29/116 R X |
| 3,639,956 | 2/1972 | Justus | 29/116 AD |
| 3,676,909 | 7/1972 | Tuomaala | 29/113 AD X |
| 3,703,862 | 11/1972 | Appenzeller | 29/113 AD X |
| 3,802,044 | 4/1974 | Spillmann et al. | 29/113 AD |
| 3,803,682 | 4/1974 | Stein | 29/116 R |
| R27,445 | 8/1972 | Kuehn | 29/116 R |

FOREIGN PATENTS OR APPLICATIONS
1,906,128  8/1970  Germany..................... 29/116 AD Primary Examiner—Alfred R. Guest
Attorney, Agent, or Firm—Pennie & Edmonds

[57] ABSTRACT

A flexure-compensating roll for a rolling mill having a rotatable roll shell partly of cylindrical shape disposed about a non-rotating beam with hydraulically actuated pistons received in the beam for support of the shell along the line of contact with a mating roll includes inboard bearings for support of the roll shell from stationary piers and outboard bearings for support of the beam from the shell, the inner race of the outboard bearings being fixed to the shell and the outer race thereof being fixed to the beam via plates or spiders, a further spider coupling to the shell for the application of torque thereto.

5 Claims, 1 Drawing Figure

U.S. Patent   April 13, 1976   3,949,455
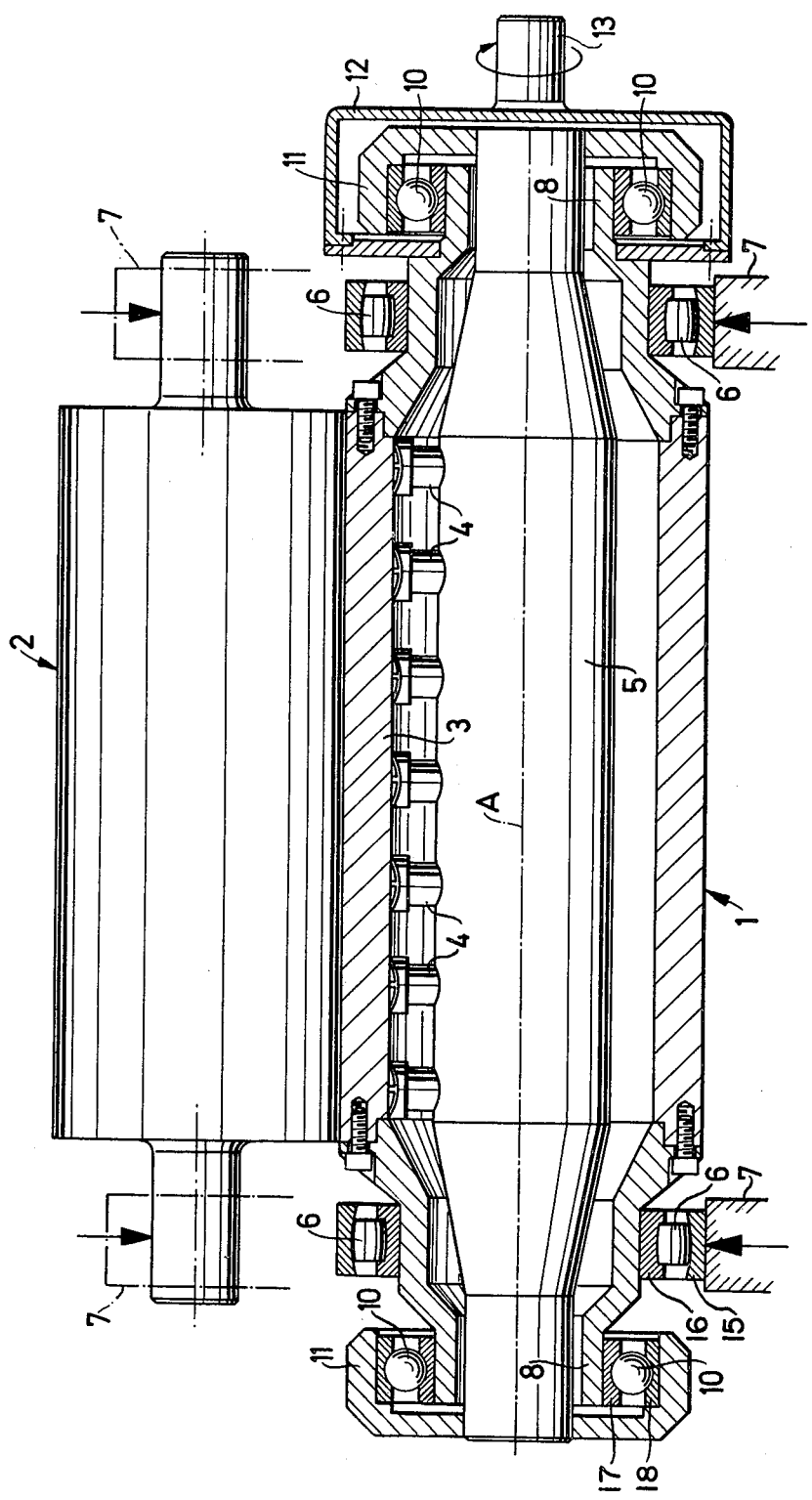

FLEXURE-COMPENSATING ROLL

The present invention relates to a flexure-compensating roll, for use in a rolling mill or in a set of calender rolls in the paper industry, for example. Such rolls are also known as controlled deflection rolls. Flexure-compensating rolls of this general character are well-known and are disclosed for example in the patent to Spillmann et al. U.S. Pat. No. 3,802,044. Such rolls include a relatively rigid and stiff beam or core about which there rotates a substantially cylindrical roll shell. To permit the roll shell, which is of relatively thin section, to be held to cylindrical or other specified shape, despite the load imposed by the material being rolled between the controlled deflection roll and its mating roll in a roll set and despite the consequent inevitable flexure of the beam and/or of the mating roll, the shell may be supported from the beam at least in part by one or more hydraulically actuated pistons which are received in radial cylindrical bores in the beam. These pistons bear against the inner surface of the roll shell in the plane containing the axes of rotation of the roll shell and of the mating roll. Thus these pistons bear against the inside surface of the roll shell immediately beneath the nip at which the roll shell and the mating roll approach each other to treat the material being rolled. Advantageously, hydrostatic lubrication is provided between these pistons and the roll shell.

The invention pertains more particularly to flexure-compensating rolls in which the roll shell is supported from abutments or piers (usually but not necessarily stationary) by means of bearings, and in which the beam (though it may be prevented from rotating) is supported inside the roll shell by means of bearings disposed between it and the roll shell. If the bearings for support of the shell from the piers and the bearings for support of the beam from the shell are at the same position lengthwise, i.e. axially, of the structure, the result is that the outside diameter of the outside bearing race, affixed to the piers, becomes undesirably large. To avoid this disadvantage, special so-called triple race bearings have been employed, as in U.S. Pat. No. 3,562,882.

Flexure-compensating rolls are also disclosed in German Auslegeschrift No. 1,292,957 and in German Offenlegungsschrift No. 1,906,128 in which the bearings for support of the beam from the shell are outboard of the bearings for support of the shell from the piers. For accommodation of these bearings the shell may extend axially at each end beyond the portion of cylindrical outer surface actually employed in the rolling operation. These axial extensions are subjected by the beam inside the shell to bending moments which improve the cylindrical shape of the shell at the edges of the operative portions thereof, reducing the excessive pressure which would otherwise be exerted at those portions on the material being passed between the flexure-compensating roll and its mating roll.

These constructions are however subject to the severe disadvantage that the ends of the beam are supported from the inner races of the outboard bearings. When the beam is fixed, this means an undesirably concentrated loading of the bearing. The operating conditions of the bearings are further adversely affected by the fact that in operation the core undergoes flexure, in consequence of which the bearings do not run true, and this may have bad results especially in the case of barrel-shaped roller bearings. In addition this construction entails a complicated shape for the roll shell, with a cylindrical central portion followed at each end by one or more conical portions, all of which increases the cost of manufacture of the roll shell.

It is an object of the invention to provide a flexure-compensating roll of the general type above described which is free of these disadvantages and which employs simple roller bearings which are loaded in an advantageous manner in operation and which moreover permits the use of a desirable simple form for the roll shell.

The flexure-compensating roll of the invention is characterized by the fact that the outboard bearings have an inner race fixed on the roll shell whereas the core is fastened to the outer races of these bearings by a suitable coupling or support element at each end of the roll.

In this way there is achieved a simple shape for the roll shell which is of reduced diameter at its ends. The most important consequence of this feature is however the fact that the core is supported from the outer races of the outboard bearings, which bearings experience rotation during operation of the roll. This produces an advantageous loading of the bearings and avoids a so-called punctiform loading of the inner races.

For support of the roll shell in the central portion thereof, there may be employed a plurality of hydrostatically lubricated pistons disposed in radial cylindrical bores in the beam, the pistons having at their outer ends hydrostatically lubricated bearing surfaces for support of the shell.

The beam can then undergo flexure with respect to the shell without affecting the shape of the nip between the roll shell and its mating roll. Other types of hydrostatically lubricated supports can however be employed, for example that in which a body of fluid is maintained under pressure between the side of the beam away from the nip and the adjacent portion of the shell, with the assistance of circumferentially spaced seals extending longitudinally between the beam and the shell.

Advantageously the bearings which support the roll shell from the frame, e.g. the piers for the roll set, and also those which support the beam from the roll shell, are both of roller bearing type. The use of such bearings results in full achievement of the feature according to the invention by means of which point loading is avoided. Other types of bearings such as plain bearings, especially hydrostatically lubricated plain bearings, can however be employed. An annular member may be employed for affixation of the beam, at each of its ends, to the outer race of an outboard bearing set of which the inner race is affixed to the shell. A similar member may be employed, affixed to the shell inboard of the outboard bearing, for transmission of driving torque to the shell.

BRIEF DESCRIPTION OF THE DRAWINGS

The invention will now be further described in terms of a presently preferred exemplary embodiment thereof and with reference to the accompanying drawings in which the single FIGURE of drawing is an axial section through a flexure-compensating roll according to the invention, shown with a solid mating roll.

DESCRIPTION OF PREFERRED EMBODIMENT

In the FIGURE, the flexure-compensating roll is generally indicated at 1 and the solid mating roll at 2. The flexure-compensating roll includes a shell 3 which is supported (in the central portion thereof) on a core or beam 5 by means of hydrostatically lubricated pistons 4. These pistons are carried in radial cylindrical bores of the beam and may be of the type shown in the U.S. patent to Spillmann et al. U.S. Pat. No. 3,802,044.

The shell is supported from foundations or piers 7 by means of first bearings generally indicated at 6. These may be of self-aligning type and include an outer race 15 which is fixed to the pier 7 and an inner race 16 which is fast to the shell 3. The shell has ends 8 of the reduced diameter as indicated and these ends, and thereby the shell itself, support the core 5 by means of second bearings generally indicated at 10. These bearings include inner races 17 affixed to the roll shell 3 and outer races 18 which are affixed to a bell- or spider-shaped annular member 11 fastened to the core 5. For drive of the roll shell, i.e. for the application of torque thereto, a further spider-like member 12 is fixed to the roll shell 3 and carries an axial shaft 13 to which the driving power can be applied.

The core 5 is prevented from rotating by means not shown which engage the core for example at the left end in the FIGURE. The construction shown makes it possible to use simple roller bearings comprising inner and outer races which are substantially less expensive than the triple-race bearings otherwise necessary. Moreover the two sets of roller bearings are loaded in the most advantageous fashion with the inner race rotating and the outer race being stationary.

The invention thus provides, as exemplarily illustrated in the drawings, a controlled deflection or flexure-compensating roll comprising a beam 5, an annular roll shell 3 engaged over the beam, two first bearings 6 disposed at spaced locations lengthwise of the shell for support of the shell, two second bearings 10 supporting the beam 5 from the shell 3, said second bearings 10 being each on the side of a separate one of said first bearings 6 remote from the other of said first bearings 6, said second bearings 10 including inner 7 and outer annular elements 18 of which the inner element 7 is affixed to the shell 3 and the outer element 18 is affixed to the beam 5, and at least one hydraulically actuated support element 4 disposed between the beam 5 and shell 3 at a position lengthwise of the shell between said first bearings 6. These hydraulically actuated support elements may take the form of a plurality of hydraulically actuated pistons disposed in radial cylindrical cavities in the beam for exertion of stress against the inner surface of the shell. The bearings may be roller bearings. For connection of the outer element 18 of each outer bearing 10 to the beam there may be employed an annular member 11 engaged between the beam 5 and the outer element 18 of such bearing. For the application of torque to the shell there may be provided a further member 12 affixed to the shell, said member including a shaft 13 coaxial with the beam and shell for the receipt of torque.

While the invention has been described hereinabove in terms of a presently preferred embodiment thereof, the invention itself is not limited thereto but rather comprehends all modifications of and departures from that embodiment properly falling within the spirit and scope of the appended claims.

I claim:

1. A controlled deflection roll comprising a beam, an annular roll shell engaged over the beam, two first bearings disposed at spaced locations lengthwise of the shell for support of the shell, two second bearings supporting the beam from the shell, said second bearings being each on the side of a separate one of said first bearings remote from the other of said first bearings, said second bearings including inner and outer annular elements of which the inner element is affixed to the shell and the outer element is affixed to the beam, and at least one hydraulically actuated support element disposed between the beam and shell at a position lengthwise of the shell between said first bearings.

2. A controlled deflection roll according to claim 1 including a plurality of hydraulically actuated pistons disposed in radial cylindrical cavities in the beam for exertion of stress against the inner surface of the shell.

3. A controlled deflection roll according to claim 1 wherein said bearings are roller bearings.

4. A controlled deflection roll according to claim 1 including at each end of the beam an annular member engaged between the beam and the outer element of one of said second bearings.

5. A controlled deflection roll according to claim 4 including a further member affixed to the shell, said member including a shaft coaxial with the shell.

* * * * *